United States Patent
Kimura et al.

(10) Patent No.: US 12,536,807 B2
(45) Date of Patent: Jan. 27, 2026

(54) APPARATUS, METHOD, AND RECORDING MEDIUM

(71) Applicant: NEC Corporation, Tokyo (JP)

(72) Inventors: Yosuke Kimura, Tokyo (JP); Nana Jumonji, Tokyo (JP); Chisato Sugawara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 18/281,637

(22) PCT Filed: Mar. 15, 2021

(86) PCT No.: PCT/JP2021/010374
§ 371 (c)(1),
(2) Date: Sep. 12, 2023

(87) PCT Pub. No.: WO2022/195676
PCT Pub. Date: Sep. 22, 2022

(65) Prior Publication Data
US 2024/0169739 A1    May 23, 2024

(51) Int. Cl.
*G06V 20/56* (2022.01)
*B60W 50/14* (2020.01)

(52) U.S. Cl.
CPC ............. *G06V 20/56* (2022.01); *B60W 50/14* (2013.01)

(58) Field of Classification Search
CPC . G06T 2207/30248; G06T 2207/30252; G06T 2207/30268; G06T 2207/10016;
(Continued)

(56) References Cited

U.S. PATENT DOCUMENTS

2009/0318121 A1* 12/2009 Marumoto ............. G07C 5/085
455/414.1
2010/0157061 A1    6/2010 Katsman et al.
(Continued)

FOREIGN PATENT DOCUMENTS

JP    2011-217116 A    10/2011
JP    2015-038773 A    2/2015
(Continued)

OTHER PUBLICATIONS

JP Office Action for JP Application No. 2023-506400, mailed on Aug. 6, 2024 with English Translation.
(Continued)

*Primary Examiner* — Nathnael Aynalem
(74) *Attorney, Agent, or Firm* — Sughrue Mion, PLLC

(57) ABSTRACT

In order to acquire an image suitable for driving instruction while reducing the image acquisition load, and to use the acquired image to output information relating to the driving of the driver of a vehicle, a driving information output device according to the present invention comprises: a communication means that communicates with an image acquisition device mounted on a vehicle; an information acquisition means that acquires, from the image acquisition device via the communication means, an image that satisfies image acquisition conditions including at least one of an image acquisition position, an image acquisition time, and a vehicle operating status and a vehicle surrounding environment at the time of image acquisition; a driving information generation means that generates driving information, which is information regarding the driving of the driver of the vehicle, on the basis of the acquired image; and an output means that outputs the driving information.

20 Claims, 10 Drawing Sheets

(58) Field of Classification Search
CPC ........ G06V 10/40; G06V 20/56; G06V 20/52; G06V 20/53; G06V 20/54; G06V 20/58; G06V 20/582; G06V 20/584; G06V 20/586; G06V 20/588; G06Q 10/06395; G06Q 10/06398; G06Q 10/06393; G08G 1/0112; G08G 1/0129; G08G 1/0133; G08G 1/202; G08G 1/205; G08G 1/207; G08G 1/20; G08G 1/048; G08G 1/166; G08G 1/0125; H04N 7/181; B60W 50/14; B60W 2050/143; B60W 2050/146; B60W 50/16
USPC ......................................................... 348/148
See application file for complete search history.

(56) References Cited

U.S. PATENT DOCUMENTS

| | | | |
|---|---|---|---|
| 2013/0093888 A1* | 4/2013 | Kim | G08B 21/06 348/148 |
| 2018/0357484 A1 | 12/2018 | Omata | |
| 2018/0370433 A1* | 12/2018 | Huang | H04N 5/272 |
| 2019/0325667 A1* | 10/2019 | Kim | G07C 5/0866 |
| 2020/0066146 A1 | 2/2020 | Ichikawa et al. | |

FOREIGN PATENT DOCUMENTS

| | | |
|---|---|---|
| JP | 2018-045303 A | 3/2018 |
| JP | 2019-149016 A | 9/2019 |
| WO | 2019/146522 A1 | 8/2019 |

OTHER PUBLICATIONS

Extended European Search Report for EP Application No. 21931431.7, dated on Jan. 15, 2024.

International Search Report for PCT Application No. PCT/JP2021/010374, mailed on May 18, 2021.

English translation of Written opinion for PCT Application No. PCT/JP2021/010374, mailed on May 18, 2021.

* cited by examiner

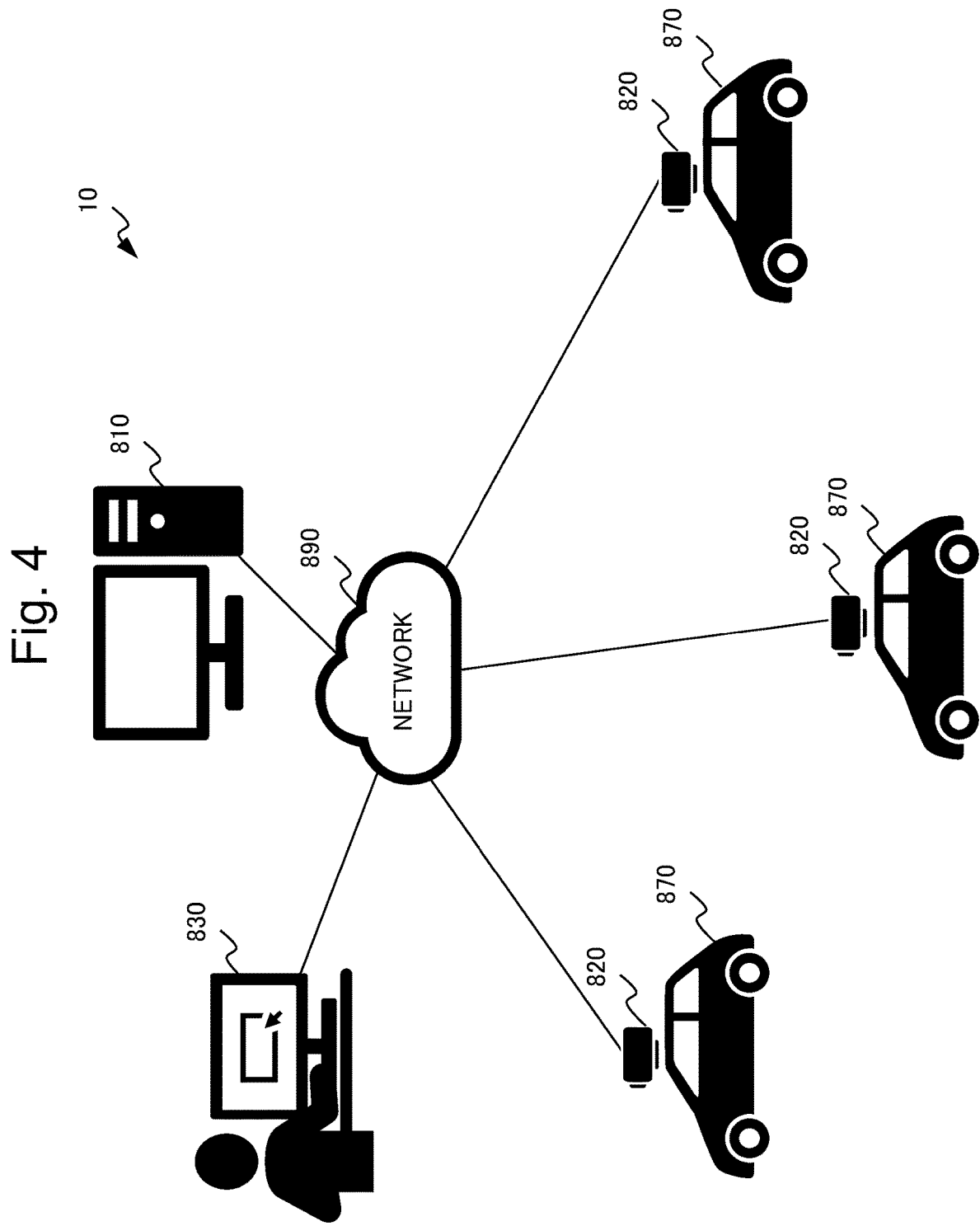

Fig. 5

| SECTION | INDICATION | VALUE OF CONDITION | |
|---|---|---|---|
| | | TIME PERIOD | POSITION |
| TIME PERIOD | MORNING | 5 AM TO 9 AM | — |
| | AFTER LUNCH | 1 PM TO 3 PM | — |
| | EVENING | 5 PM TO 7 PM | — |
| | NIGHT | 7 PM TO 10 PM | — |
| | LATE AT NIGHT | 10 PM TO 5 AM | — |
| WEATHER | LOW-PRESSURE SYSTEM | TIME DURING WHICH PREDETERMINED PRESSURE CONDITION IS SATISFIED | — |
| | RAINY | TIME PERIOD WITH AN AMOUNT OF RAINFALL OF 1 mm OR MORE | — |
| | SNOW ACCUMULATION | TIME PERIOD WITH AN AMOUNT OF ACCUMULATED SNOW OF 1 cm OR MORE | — |
| | FREEZING | TIME PERIOD AT TEMPERATURES BELOW ZERO DEGREE | — |
| SPOT | EXPRESSWAY | — | POSITION OF EXPRESSWAY |
| | MOUNTAIN ROAD | — | ROAD WITH A GRADIENT OF 10% OR MORE |
| | INTERSECTION | — | SPECIFIED POSITION ON ROAD |
| | PARKING LOT | — | SPECIFIED REGION |
| | NEAR MISS | — | SPECIFIED POSITION ON ROAD |
| WORK | CONSECUTIVE DAYS OF WORK | DATE ON WHICH DRIVER HAS WORKED FOR THREE OR MORE CONSECUTIVE DAYS | — |
| | TRAFFIC JAM | 9 AM TO 11 AM AND 4 PM TO 6 PM ON WEEKDAYS | — |
| TRAVEL SCENE | BICYCLE | TIME TO GO TO AND GET OUT OF SCHOOL | PREDETERMINED AREA AROUND SCHOOL |

Fig. 6

| IMAGE ACQUISITION CONDITION | DIAGNOSTIC CRITERION |
|---|---|
| RAINY OR SNOWY | INTER-VEHICLE DISTANCE |
| EARLY MORNING, AFTER LUNCH, LATE AT NIGHT, OR EXPRESSWAY | AROUSAL LEVEL OR CONCENTRATION LEVEL |
| TRAFFIC JAM OR INTERSECTION | FREQUENCY OF HORN BEEPING OR INTER-VEHICLE DISTANCE |
| INTERSECTION | LEVEL OF ATTENTION TO SURROUNDINGS |
| CONTINUANCE OF SOUNDS FOR CERTAIN PERIOD OF TIME OR LONGER | ON PHONE |

Fig. 7

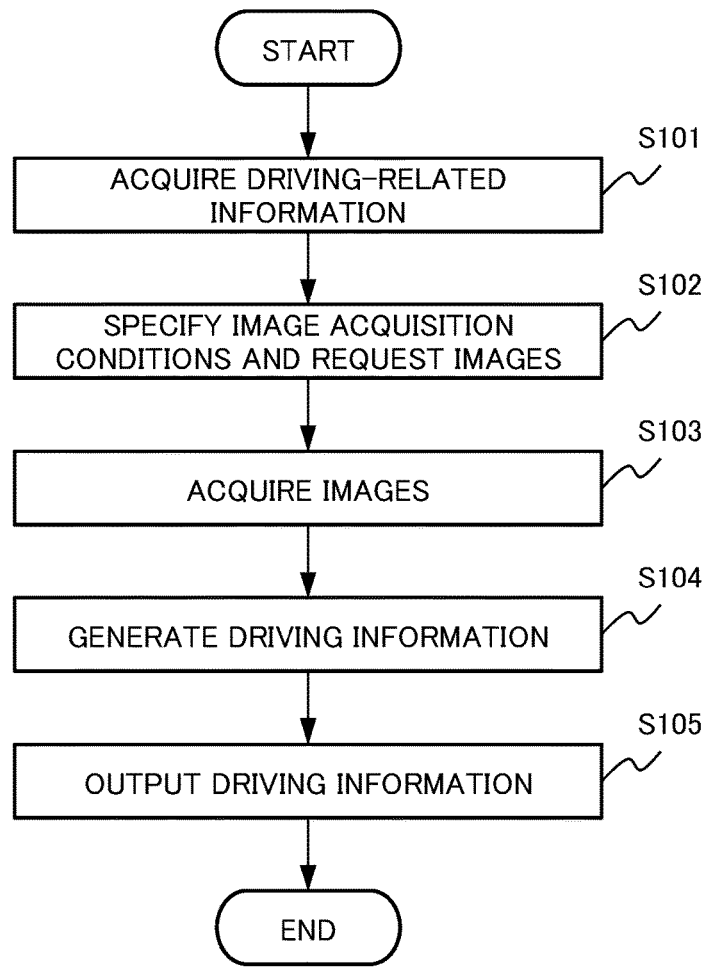

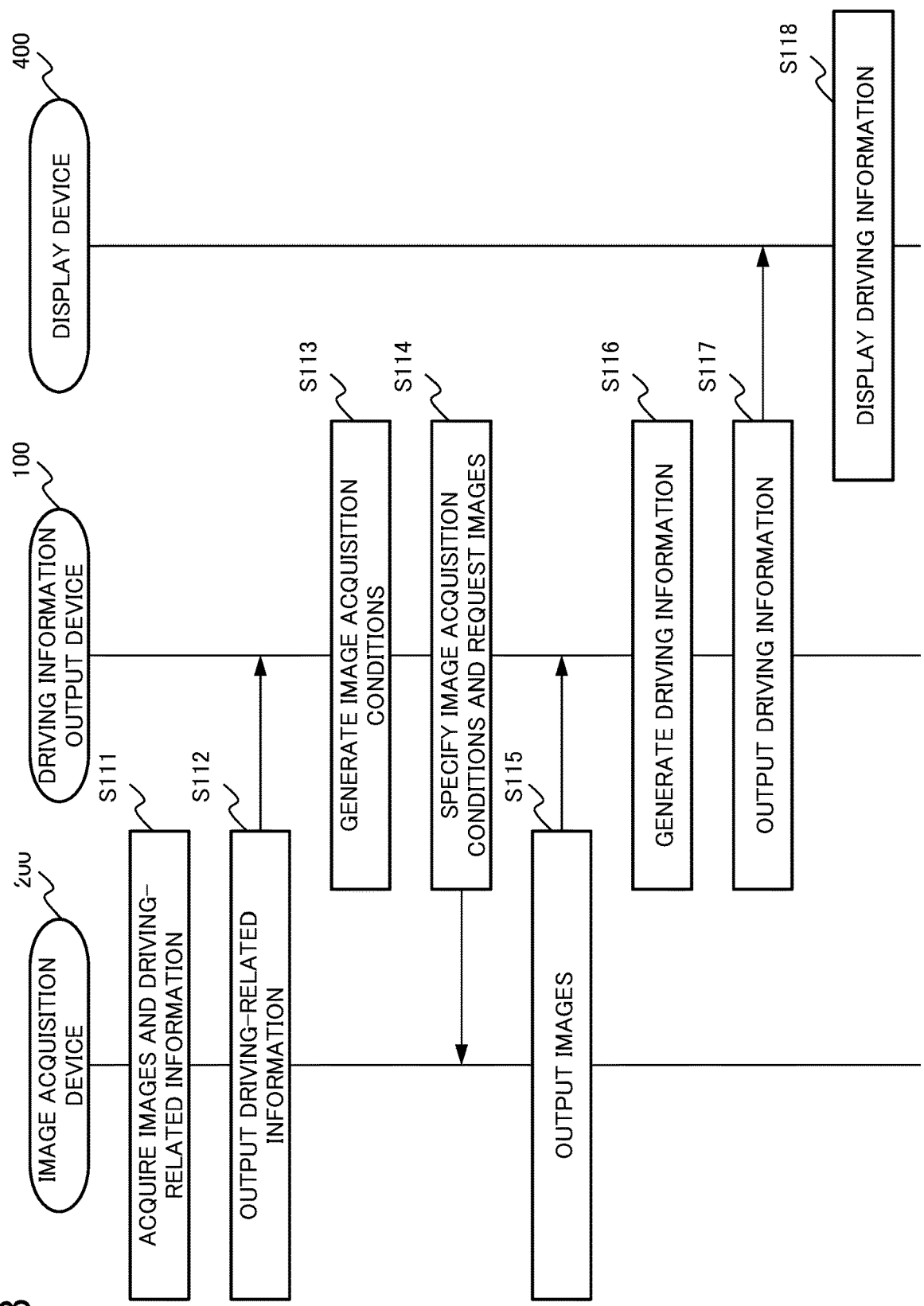

APPARATUS, METHOD, AND RECORDING MEDIUM

This application is a National Stage Entry of PCT/JP2021/010374 filed on Mar. 15, 2021, the contents of all of which are incorporated herein by reference, in their entirety.

TECHNICAL FIELD

The present invention relates to information related to a vehicle, and in particular, to information for a driver of the vehicle.

BACKGROUND ART

For provision of information related to driving by a driver, there has been proposed a technique using a video acquired by a drive recorder (see PTL 1, for example).

A dangerous driving analysis device described in PTL 1 (hereinafter, simply referred to as "dangerous driving analysis device") receives a video image, travel information, driving information, and position information from an information acquisition device. The dangerous driving analysis device then determines whether the safe driving standards are satisfied using the acquired video or the like, and extracts dangerous driving operations not satisfying the safe driving standards. In PTL 1, the safe driving standards include a relative distance to an object, a time to collision, and the like.

CITATION LIST

Patent Literature

PTL 1: JP 2015-038773 A

SUMMARY OF INVENTION

Technical Problem

In general, in the event of an accident, dangerous driving operations (for example, near misses) that did not lead to an accident have frequently occurred before the occurrence of the accident. In addition, besides dangerous driving operations, there have occurred even more driving operations that are not obvious dangerous driving operations but may lead to an accident (hereinafter referred to as "potentially dangerous driving operations").

Therefore, in the guidance on safe driving of a vehicle using a video, it is better to use not only videos of driving operations that have caused accidents (hereinafter, referred to as "accident driving operations") and dangerous driving operations but also a video of potentially dangerous driving operations.

However, the video acquired by the drive recorder are a large amount of data including a plurality of images. Therefore, acquiring all the images included in the video acquired by the drive recorder would significantly increase the communication traffic or the storage capacity. In addition, in the case of a company or the like, the number of vehicle(s) to be managed (that is, the number of drive recorder(s)) is not limited to one. Therefore, it is difficult in actual practices to acquire all the images included in the video acquired by the drive recorder due to a high load.

In general, most of driving operations are normal driving operations, not accident driving operations, dangerous driving operations, or potentially dangerous driving operations. The video acquired during normal driving operations is not suitable for guidance on safe driving. That is, a large part of the video acquired by the drive recorder is video (images) not suitable for guidance on safe driving. Therefore, it is not efficient to acquire all video (images) from the drive recorder.

Therefore, it is desired to acquire images suitable for guidance on safe driving from an image acquisition device mounted in a vehicle such as a drive recorder while reducing the load of image acquisition.

According to the technique described in PTL 1, all videos and the like are transmitted from the information acquisition device to the dangerous driving analysis device. The dangerous driving analysis device then extracts dangerous driving operations not satisfying the safe driving standards based on the videos and the like. Thus, PTL 1 has an issue that the load of image acquisition cannot be reduced.

In addition, according to the technique described in PTL 1, information related to dangerous driving operations is extracted based on a relative distance or the like. However, according to the technique described in PTL 1, information related to driving operations that do not reach dangerous driving operations but are better used for guidance on safe driving (for example, potentially dangerous driving operations) is not extracted.

As described above, the technique described in PTL 1 has an issue that images suitable for guidance on safe driving cannot be acquired from the drive recorder.

An object of the present invention is to solve the above issues, and to provide a driving information output device that acquires an image suitable for guidance on driving while reducing a load of image acquisition, and outputs information related to driving of a driver of a vehicle using the acquired image.

Solution to Problem

A driving information output device according to an aspect of the present invention includes: a communication means that communicates with an image acquisition device mounted in a vehicle; an information acquisition means that acquires, from the image acquisition device via the communication means, an image that satisfies an image acquisition condition including an image acquisition position, an image acquisition time, and at least one of an operating state of the vehicle and a surrounding environment of the vehicle at time of image acquisition; a driving information generation means that generates driving information that is information related to driving by a driver of the vehicle based on the acquired image; and an output means that outputs the driving information.

A driving information output system according to an aspect of the present invention includes: the driving information output device described above; an image acquisition device that outputs an image to the driving information output device; and a display device that displays the driving information output by the driving information output device.

A driving information output method according to an aspect of the present invention includes: communicating with an image acquisition device mounted in a vehicle; acquiring, from the image acquisition device, an image that satisfies an image acquisition condition including an image acquisition position, an image acquisition time, and at least one of an operating state of the vehicle and a surrounding environment of the vehicle at time of image acquisition; generating driving information that is information related to driving by a driver of the vehicle based on the acquired image; and outputting the driving information.

A driving information output method according to an aspect of the present invention includes: executing, by a driving information output device, the driving information output method stated above; outputting, by the image acquisition device, an image to the driving information output device; and displaying, by a display device, the driving information output by the driving information output device.

A recording medium according to an embodiment of the present invention records a program for causing a computer to execute: a process of communicating with an image acquisition device mounted in a vehicle; a process of acquiring, from the image acquisition device, an image that satisfies an image acquisition condition including an image acquisition position, an image acquisition time, and at least one of an operating state of the vehicle and a surrounding environment of the vehicle at time of image acquisition; a process of generating driving information that is information related to driving by a driver of the vehicle based on the acquired image; and a process of outputting the driving information.

Advantageous Effects of Invention

An example advantage according to the present invention is to acquire images suitable for guidance on driving while reducing the load of image acquisition, and to provide information related to driving of a driver using the acquired images.

BRIEF DESCRIPTION OF DRAWINGS

FIG. 4 is a diagram illustrating an example of a specific configuration of the driving information output system.

FIG. 5 is an example of correspondence relationships between indications and values of conditions.

FIG. 6 is a diagram illustrating an example of correspondences between image acquisition conditions and diagnostic criteria.

FIG. 7 is a flowchart illustrating an example of operations of a driving information output device according to the first example embodiment.

FIG. 8 is a sequence diagram illustrating an example of operations of the driving information output system according to the first example embodiment.

EXAMPLE EMBODIMENT

Related Art

Figure 1:
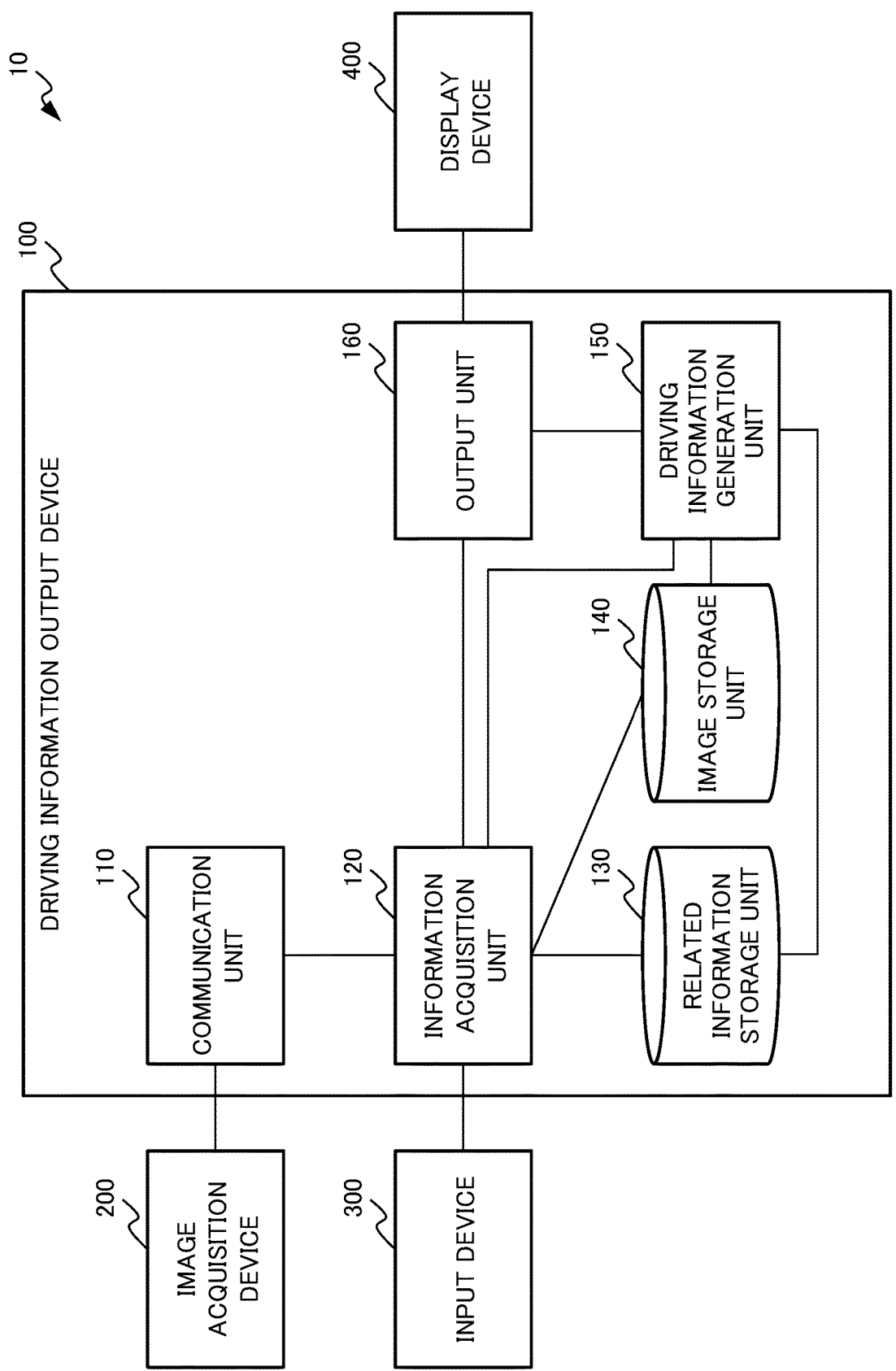
FIG. 1 is a block diagram illustrating an example of a configuration of a driving information output system according to a first example embodiment.

Prior to description of the example embodiments in the present invention, a technology related to the example embodiments will be described.

As a method of reducing the amount of data acquired from a drive recorder, there is assumed a method by which to acquire images randomly selected from among images included in the video acquired by the drive recorder (hereinafter referred to as "first related method"). However, in general, most of images acquired by a drive recorder are not suitable for guidance on safe driving. Therefore, in many cases, images suitable for guidance on safe driving cannot be acquired by the first related method.

In the first related method, it is assumed that the number of images acquired from the drive recorder is increased so that images suitable for guidance on safe driving can be acquired. However, most of the images acquired by the drive recorder are not suitable for guidance on safe driving. Therefore, in the first related method, in order to acquire images suitable for guidance on safe driving, it is necessary to acquire a considerably large number of images for images required for the guidance. That is, in this case, it is not possible to reduce the load of image acquisition by the first related method.

Alternatively, there is assumed a method by which the drive recorder saves conditions for images to be transmitted, selects images associated to the saved conditions from among the acquired images, and outputs the selected images to a predetermined device (hereinafter referred to as "second related method").

However, there is usually not one situation but a plurality of situations in which the guidance on safe driving is required. Furthermore, the situations necessary for the guidance are not necessarily fixed. The situations necessary for the guidance may require combining a plurality of conditions.

Therefore, in the second related method, if the drive recorder outputs images all satisfying conditions associated to the situations, the drive recorder needs to output many images. In this case, it is not possible to reduce the load of outputting the images (that is, the load of image acquisition) by the second related method.

On the other hand, if the conditions for the images to be output from the drive recorder are narrowed, there occur many cases where the number of output images are insufficient for the guidance. That is, in this case, it is not possible to acquire images suitable for guidance by the second related method.

Example embodiments of the present invention acquire images suitable for guidance on driving while reducing a load of image acquisition based on configurations and operations described below, and provides information related to driving of a driver of a vehicle using the acquired images.

Next, example embodiments of the present invention will be described with reference to the drawings.

Each drawing is for describing example embodiments of the present invention. However, example embodiments of the present invention are not limited to the description in the drawings. In addition, similar components illustrated in the drawings are denoted with the same reference numerals, and repeated description thereof may be omitted.

First Example Embodiment

A first example embodiment will be described with reference to the drawings.

[Description of Configuration]

FIG. 1 is a block diagram illustrating an example of a configuration of a driving information output system 10 according to the first example embodiment.

The driving information output system 10 includes a driving information output device 100, an image acquisition device 200, an input device 300, and a display device 400.

The image acquisition device 200 is mounted in a vehicle (not illustrated), and continuously acquires and stores a plurality of images of a road or the like on which the vehicle passes.

The images acquired by the image acquisition device 200 may be either still images or moving images. Alternatively, the images acquired by the image acquisition device 200 may include both still images and moving images. In a case where the image acquisition device 200 acquires moving images, the frame rate of the moving images may be fixed or variable.

The image acquisition device 200 may acquire images not continuously but intermittently at predetermined intervals or based on a predetermined condition.

The image acquisition device 200 may further acquire images including a plurality of images (for example, a front image, a rear image, and a vehicle interior image).

The image acquisition device 200 may include sound in the images. For example, the image acquisition device 200 may acquire, as the images, moving images including at least one of sounds inside the vehicle and sounds outside the vehicle.

The image acquisition device 200 further acquires information related to driving at the time of image acquisition (hereinafter, referred to as "driving-related information"), and stores the driving-related information in association with the images.

The driving-related information is information related to the vehicle and the driver at the time of image acquisition, and is information that includes the image acquisition position, the image acquisition time, and at least one of the operating state of the vehicle and the surrounding environment of the vehicle at the time of image acquisition.

The image acquisition position is the position of the vehicle when the image acquisition device 200 acquires an image. For example, the acquisition position is latitude and longitude. The acquisition position may include information different from the latitude and longitude, such as the altitude of the vehicle.

The image acquisition time is a time when the image acquisition device 200 acquires an image. The acquisition time may be a certain length of time such as a time period. The unit of the acquisition time is not limited to hours, minutes, and seconds, and may be the unit of a predetermined period of time such as days, weeks, months, seasons, or years.

The operating state of the vehicle is information related to the operation of the vehicle in which the image acquisition device 200 is mounted (for example, at least one of information related to traveling of the vehicle and information related to handling of the vehicle).

The information related to traveling of the vehicle is set arbitrarily as long as it relates to the states of traveling and stopping of the vehicle and changes in the traveling state. For example, the information related to traveling of the vehicle is at least one of the speed, the acceleration, the traveling direction, and the inclination of the vehicle, and the distance to an adjacent vehicle. For example, if the image acquisition device 200 includes a sensor (for example, an accelerometer or a distance meter), the image acquisition device 200 may include a value detected by the sensor (for example, the acceleration or the distance to an adjacent vehicle) in the driving-related information.

The information related to handling of the vehicle is information related to driving operations of the vehicle by the driver. Examples of the information related to driving operations of the vehicle by the driver include operations of the steering wheel, operations of the pedals (accelerator and brake), operations of levers (shift lever, indicator lever, wiper lever, and the like), and opening and closing of the door of the vehicle by the driver.

The surrounding environment of the vehicle includes an environment around the vehicle at the time of image acquisition (for example, weather (for example, temperature and humidity), the type of a road, or the congestion state). For example, if the vehicle includes a thermo-hygrometer, the image acquisition device 200 may acquire a measurement value from the thermo-hygrometer. Alternatively, if the vehicle includes an in-vehicle electronic toll collection (ETC) device, the image acquisition device 200 may acquire information on the road on which the vehicle is traveling from the in-vehicle ECT device. Alternatively, the image acquisition device 200 may determine the congestion state using at least one of the changes in the acceleration acquired from the accelerometer and the use frequency of the accelerator and brake acquired from the vehicle.

If sounds can be acquired, the image acquisition device 200 may include sounds in the surrounding environment of the vehicle. For example, if the image acquisition device 200 acquires, as the image, a moving image including sounds of at least one of the inside and the outside of the vehicle as an image, the image acquisition device 200 may include the sounds acquired together with the image in the driving-related information.

Then, the image acquisition device 200 stores the image and the driving-related information in association with each other.

The image acquisition device 200 further outputs at least part of the driving-related information to the driving information output device 100.

The timing at which the image acquisition device 200 outputs the driving-related information is arbitrary. For example, the image acquisition device 200 may output the driving-related information at each image acquisition. Alternatively, the image acquisition device 200 may output the non-output driving-related information to the driving information output device 100 when a predetermined cycle or a predetermined condition is satisfied. For example, the image acquisition device 200 may output the non-output driving-related information to the driving information output device 100 at a predetermined cycle. Alternatively, the image acquisition device 200 may output the non-output driving-related information to the driving information output device 100 when being connected to a predetermined network.

Alternatively, the image acquisition device 200 may output the driving-related information in response to a user instruction.

Further, upon acquiring a predetermined condition (hereinafter, referred to as "image acquisition condition") from the driving information output device 100, the image acquisition device 200 selects images that satisfy the acquired image acquisition condition, and outputs the selected images to the driving information output device 100. The image acquisition condition will be further described later.

The image acquisition device 200 is set arbitrarily as long as it is an image acquisition device mounted in a vehicle. For example, the image acquisition device 200 may be a drive recorder installed for the purpose of recording a situation at the time of occurrence of an automobile accident. Alternatively, the image acquisition device 200 may be a camera that captures images of a landscape around the vehicle (for example, an omnidirectional camera).

The image acquisition device 200 may output an image acquired when a predetermined condition is satisfied to the driving information output device 100, separately from the output of the images relevant to the image acquisition condition acquired from the driving information output device 100.

For example, the image acquisition device 200 may output an image and the driving-related information of the image to the driving information output device 100 acquired when the absolute value of the acceleration of the vehicle is equal to or greater than a threshold. Hereinafter, this image will be referred to as "pre-output image".

The input device 300 outputs a user instruction (for example, an instruction related to the image acquisition condition) to the driving information output device 100.

The display device 400 displays information related to driving by the driver of the vehicle (hereinafter, referred to as "driving information") output by the driving information output device 100. If the driving information output device 100 outputs the driving information and the image associated to the driving information, the display device 400 may display the driving information and the image associated to the driving information. The driving information will be further described later.

The display device 400 may acquire information related to a user instruction from the driving information output device 100 and display the information.

The input device 300 and the display device 400 is set arbitrarily as long as they can achieve the above-described functions.

The input device 300 is a keyboard, a mouse, or a touch pad, for example.

The display device 400 is a liquid crystal display, an organic electroluminescence display, or electronic paper, for example.

The input device 300 and the display device 400 may be included in one device instead of different devices. For example, the input device 300 and the display device 400 may be implemented using a computer device including a liquid crystal display, a keyboard, and a mouse. Alternatively, the input device 300 and the display device 400 may be implemented by using a tablet terminal including a touch panel including a touch pad and a liquid crystal display.

The driving information output device 100 acquires the driving-related information from the image acquisition device 200. The driving information output device 100 stores the acquired driving-related information.

Then, the driving information output device 100 generates an image acquisition condition used to acquire images from the image acquisition device 200 based on the driving-related information.

The image acquisition condition is a condition used to select images in the image acquisition device 200. Therefore, the image acquisition condition is a condition relevant to at least some of the items included in the driving-related information. That is, the image acquisition condition includes the image acquisition position, the image acquisition time, and at least one of the operating state of the vehicle and the surrounding environment of the vehicle at the time of image acquisition.

The image acquisition condition will be further described later.

In generating the image acquisition condition, the driving information output device 100 may acquire a user instruction through a predetermined device (for example, the input device 300), and generate the image acquisition condition in response to the acquired instruction.

Alternatively, the driving information output device 100 may acquire at least some or all of the image acquisition conditions from a predetermined device (for example, the input device 300). Therefore, in the following description, the generation of the image acquisition condition includes the acquisition of the image acquisition condition.

In acquiring a user instruction related to generation of the image acquisition condition or acquiring the image acquisition condition, the driving information output device 100 may output information related to the image acquisition condition to a predetermined device (for example, the display device 400).

An example of operations in this case will be described using the input device 300 and the display device 400.

The display device 400 acquires information related to the image acquisition condition from the driving information output device 100. Then, the display device 400 displays the acquired information.

Figure 2:
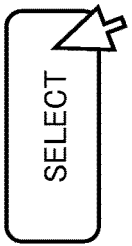
FIG. 2 is a diagram illustrating an example of display of information related to image acquisition conditions.

FIG. 2 is a diagram illustrating an example of display of information related to image acquisition conditions.

Referring to FIG. 2, the display device 400 displays options related to time, day, spot, and weather as information related to the image acquisition conditions.

Then, the user operates the input device 300 (for example, a mouse or the like) to select a desired item from the options (in FIG. 2, black squares indicate selected items), and confirms the selected items as image acquisition conditions (for example, clicks "select").

The input device 300 outputs the confirmed items to the driving information output device 100.

The driving information output device 100 acquires the confirmed items from the input device 300. The driving information output device 100 generates image acquisition conditions using the acquired items.

For example, in the case of FIG. 2, the driving information output device 100 acquires "early morning", "late night", "rainy", and "intersection" as instructions related to the image acquisition conditions. The driving information output device 100 then generates image acquisition conditions for acquiring an image associated to the acquired instructions.

In accordance with such operations, the driving information output device 100 can use image acquisition conditions flexibly associated to the desire of a user or the like.

The description returns to the description with reference to FIG. 1.

The driving information output device 100 requests an image from the image acquisition device 200 by specifying an image acquisition condition.

Then, the driving information output device 100 acquires an image satisfying the image acquisition condition from the image acquisition device 200. The driving information output device 100 may acquire images from a plurality of image acquisition devices 200. For example, the driving information output device 100 may output the same image acquisition condition to the plurality of image acquisition devices 200, and acquire images satisfying the same image acquisition condition from the plurality of image acquisition devices 200.

The driving information output device 100 then generates information (driving information) related to the driving by the driver of the vehicle using the acquired image. When having acquired images from the plurality of image acquisition devices 200, the driving information output device 100 may generate driving information related to each of the images.

The driving information is used for guidance on driving. That is, the image acquired based on the image acquisition condition is an image for generating driving information used for guidance on driving. Therefore, the image acquisition condition is a condition for acquiring an image suitable for guidance on driving. For example, the image acquisition condition is a condition for acquiring an image related to potentially dangerous driving operations.

Then, the driving information output device 100 outputs the generated driving information to a predetermined device (for example, the display device 400). The driving information output device 100 may output an image (for example, a part or all of the image used to generate the driving information) associated to the driving information in addition to the driving information.

Then, as described above, the display device 400 displays the acquired driving information (and images).

A method of displaying the driving information (and the images) on the display device 400 is set arbitrarily. The user may appropriately determine a method of displaying the driving information (and the images) on the display device 400.

Figure 3:
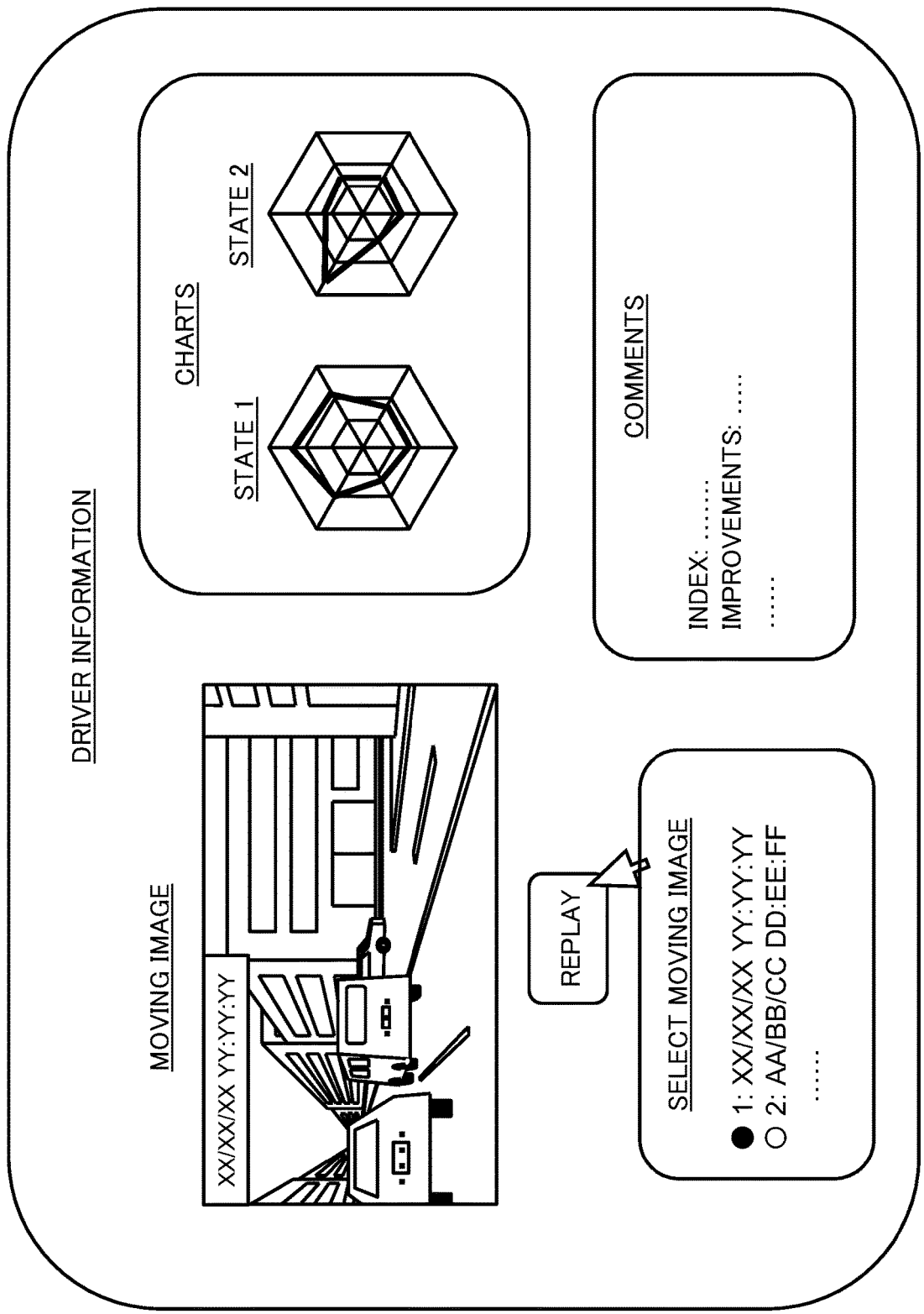
FIG. 3 is a diagram illustrating an example of display of driving information.

FIG. 3 is a diagram illustrating an example of display of driving information.

In FIG. 3, the display device 400 displays radar charts of predetermined states included in the driving information (for example, the state of the driver and the state of the vehicle) at the upper right, as an example of the driving information. Furthermore, in FIG. 3, the display device 400 displays predetermined comments (for example, indexes of safe driving and improvements) with respect to the above states at the lower right, as an example of the driving information. Further, in FIG. 3, the display device 400 displays an image (for example, a moving image) associated to the driving information at the upper left.

In FIG. 3, the display device 400 displays a list of selectable moving images at the lower left. For example, the user operates the input device 300 to select a moving image to be replayed from the list of moving images at the lower left (In FIG. 3, the moving image with a black circle is the selected moving image) and click "replay", and refers to the moving image.

The display device 400 may provide a part or all of at least one of the driving information and the display content to the driver. For example, the display device 400 may print out the display content. Alternatively, the display device 400 may output a part or all of at least one of the driving information and the display content to the portable device of the driver.

The driving information output device 100 may provide the driving information to the driver.

The driving-related information is information that includes no image. Therefore, the driving-related information is considerably smaller in data amount than the images. As a result, in the driving information output device 100, the load of acquiring the driving-related information is considerably smaller than the load of acquiring the images.

The driving information output device 100 acquires images satisfying the image acquisition condition from the image acquisition device 200. That is, the driving information output device 100 acquires, from the image acquisition device 200, not all images but some images suitable for guidance on driving. Therefore, the driving information output device 100 reduces the load of image acquisition as compared to that in the case of acquiring all the images.

The image acquisition condition is a condition for acquiring an image suitable for guidance on driving. Therefore, the driving information output device 100 acquires an image suitable for guidance on driving using the image acquisition condition. The driving information output device 100 then generates information (driving information) related to the driving by the driver of the vehicle using the acquired image. That is, the driving information output device 100 generates driving information using an image suitable for guidance on driving.

Then, the driving information output device 100 outputs the driving information to a predetermined device (for example, the display device 400).

As described above, the driving information output device 100 acquires an image suitable for guidance on driving while reducing the load of image acquisition, and outputs information (driving information) related to driving by the driver of the vehicle using the acquired image.

FIG. 4 is a diagram illustrating an example of a specific configuration of the driving information output system 10.

Referring to FIG. 4, the driving information output system 10 includes a server 810 as the driving information output device 100, a drive recorder 820 as the image acquisition device 200, and a terminal device 830 as the input device 300 and the display device 400. Referring to FIG. 4, the driving information output system 10 also includes vehicles 870 as mobile objects that move with the drive recorder 820. Referring to FIG. 4, the driving information output system 10 further includes a network 890 as a communication path to which the devices are connected. FIG. 4 is a diagram illustrating an example of a case where a plurality of drive recorders 820 is used.

The network 890 is a communication path that connects the devices.

Each vehicle 870 travels on a road, equipped with the drive recorder 820.

The drive recorder 820 acquires and stores the image of the road and the driving-related information related to the image. The drive recorder 820 further outputs the driving-related information to the server 810.

Note that the drive recorder 820 is generally mounted in the interior of (inside) the vehicle 870. However, FIG. 2 illustrates the drive recorder 820 adjacent to the outside of the vehicle 870 for easy understanding. The drive recorder 820 may be mounted in the exterior of (outside) the vehicle 870.

The server 810 acquires and stores the driving-related information from the drive recorder 820.

The server 810 then generates an image acquisition condition based on the driving-related information. At this time, the server 810 may acquire a user instruction related to the image acquisition condition from the terminal device 830. The server 810 may further output information related to the instruction to the terminal device 830.

The server 810 acquires an image from the drive recorder 820 using the image acquisition condition. The server 810 may acquire images from a plurality of drive recorders 820.

The server 810 then generates information (driving information) related to the driving by the driver of the vehicle using the acquired image.

The server 810 then outputs the generated driving information to the terminal device 830. The server 810 may output an image associated to the generated driving information to the terminal device 830.

The terminal device 830 displays the driving information acquired from the server 810. If the server 810 outputs the driving information and the image, the terminal device 830 displays the driving information and the image acquired from the server 810.

The server 810, the drive recorder 820, the terminal device 830, the vehicle 870, and the network 890 are not particularly limited. They may be generally sold products. Therefore, detailed descriptions thereof will be omitted.

The description returns to the description with reference to FIG. 1.

Next, a configuration of the driving information output device 100 will be described.

The driving information output device 100 includes a communication unit 110, an information acquisition unit 120, a related information storage unit 130, an image storage unit 140, a driving information generation unit 150, and an output unit 160.

The communication unit 110 relays communication between the image acquisition device 200 and the information acquisition unit 120. The image acquisition device 200 and the information acquisition unit 120 may operate asynchronously. In that case, the communication unit 110 may operate as a buffer (buffer device) in data transfer between the image acquisition device 200 and the information acquisition unit 120.

The information acquisition unit 120 acquires the driving-related information from the image acquisition device 200 via the communication unit 110. The information acquisition unit 120 stores the acquired driving-related information in the related information storage unit 130.

The related information storage unit 130 stores the driving-related information.

The information acquisition unit 120 further generates an image acquisition condition for acquiring an image from the image acquisition device 200.

The image acquisition condition is a condition used to select an image in the image acquisition device 200, and is a condition relevant to at least some of the items included in the driving-related information. That is, the image acquisition condition includes the image acquisition position, the image acquisition time, and at least one of the operating state of the vehicle and the surrounding environment of the vehicle at the time of image acquisition.

A method of generating the image acquisition condition may be any method.

For example, the information acquisition unit 120 may set an item stored in advance or an item included in the acquired driving-related information as the image acquisition condition.

Alternatively, the information acquisition unit 120 may select an item to be used as the image acquisition condition from items stored in advance or items included in the acquired driving-related information based on a predetermined rule, and set the selected item as the image acquisition condition.

For example, the information acquisition unit 120 may select an item to be used as the image acquisition condition in correspondence with a season (spring, summer, autumn, or winter) or a calendar month. For example, the driving information generation unit 150 may use items related to snow accumulation and freezing as image acquisition conditions in winter, and items related to heavy rain and thunderstorm as image acquisition conditions in summer.

The acquired image is used for guidance on driving. Therefore, the image acquisition condition is desirably a condition suitable for guidance on driving. For example, the image acquisition condition is a condition under which an image related to potentially dangerous driving operations can be acquired. Specifically, for example, the image acquisition condition is that the image acquisition time is early morning and late night, or the image acquisition position is an intersection. Alternatively, the image acquisition condition is an acceleration whose an absolute value is larger than a predetermined threshold. However, the image acquisition condition is not limited to the above.

Alternatively, in the generation of the image acquisition condition, the information acquisition unit 120 may acquire a user instruction related to the generation of the image acquisition condition from a predetermined device (for example, the input device 300), and generate the image acquisition condition in response to the acquired instruction. For example, if "rainfall period" is acquired from the input device 300 as a user instruction related to generation of the image acquisition condition, the information acquisition unit 120 generates the image acquisition condition based on the acquired "rainfall period".

In this case, as the image acquisition condition, the information acquisition unit 120 may generate the image acquisition condition from the indication acquired as a user instruction based on a correspondence relationship between a predetermined indication and a specific value.

FIG. 5 is an example of correspondence relationships between indications and values of conditions.

(1) The section of time periods has indications related to the time periods in which the image acquisition device 200 acquired images.

(2) The section of weather has indications related to the weather in which the image acquisition device 200 acquired images.

(3) The section of spots has indications related to the spots where the image acquisition device 200 acquired images.

(4) The section of work has an indication related to driving work of a driver of a vehicle on which the image acquisition device 200 is mounted.

(5) The section of travel scenes has indications related to the surrounding environments of the vehicle on which the image acquisition device 200 is mounted.

For example, if "morning" is acquired from the input device 300 as a user instruction, the information acquisition unit 120 uses "5:00 AM to 9:00 AM" as the image acquisition condition. That is, in this case, the information acquisition unit 120 acquires the images captured at "5:00 AM to 9:00 AM" from the image acquisition device 200.

Alternatively, if "consecutive days of work" is acquired from the input device 300 as a user instruction, the information acquisition unit 120 uses "the date on which the driver has worked for three or more consecutive days" as the image acquisition condition, for example. The source of the information related to the driver's attending work may be any source. For example, the information acquisition unit 120 acquires the date on which the driver has worked for three or more consecutive days from the work management system of the driver. The information acquisition unit 120 then acquires images captured on the acquired date from the image acquisition device 200.

Alternatively, if "bicycle" is acquired from the input device 300 as a user instruction, the information acquisition unit 120 uses the position of "around school" and the periods of "time to go to and get out of school" as the image acquisition conditions. More specifically, the information acquisition unit 120 acquires images satisfying the following two conditions from the image acquisition device 200, for example:

(1) Around the school: for example, a position included in a circle with a radius of 1 km centered on the school; and (2) Time to go to school (for example, 8:00 AM to 9:00 AM) and time to get out of school (for example, 3:00 PM to 5:00 PM).

The information acquisition unit 120 may not use only one indication, but may use a combination of a plurality of indications. For example, the information acquisition unit 120 may use image acquisition conditions "evening" and "rainy" (that is, the conditions for acquiring an image at 5:00 PM to 7:00 PM and when the rainfall amount is 1 mm or more).

The indications illustrated in FIG. 5 are examples of the indications. The driving information output device 100 may use indications different from those in FIG. 5.

For example, in addition to the indications illustrated in FIG. 5, indications related to temperature, humidity, atmospheric pressure, wind speed, and the like may be used as the indications of the weather. Alternatively, the indications of the spot may be the types of road (municipal road, prefectural road, national road, and expressway). Alternatively, the indications of the spot may include other information related to a road or the like on which the vehicle travels (for example, the number of lanes or one-way traffic).

The values of the conditions illustrated in FIG. 5 are examples. The information acquisition unit 120 may use different values of conditions for the indications illustrated in FIG. 5.

The description returns to the description with reference to FIG. 1.

The information acquisition unit 120 may acquire at least some or all of the image acquisition conditions from a predetermined device (for example, the input device 300). Therefore, as already stated, in the description of the present example embodiment, the generation of the image acquisition condition includes the case of acquiring the image acquisition condition.

Alternatively, if the driving information output device 100 acquires a pre-output image from the image acquisition device 200, the information acquisition unit 120 may use at least a part of the driving-related information of the pre-output image (for example, the acquisition position of the pre-output image) as the image acquisition condition.

In acquisition of a user instruction related to generation of the image acquisition condition or acquisition of the image acquisition condition, the information acquisition unit 120 may output information related to the image acquisition condition to a predetermined device (for example, the display device 400) via the output unit 160.

For example, the information acquisition unit 120 may store items that can be used as image acquisition conditions in advance, and output the stored items to the display device 400.

Alternatively, the information acquisition unit 120 may extract items included in the acquired driving-related information, and output the extracted items to the display device 400.

The images acquired using the image acquisition condition is used to generate the driving information. Therefore, if the quantity of the images is small, there is a possibility that the accuracy of the generated driving information becomes low. On the other hand, if the quantity of the images is large, the processing load of generating the driving information increases. Therefore, it is desirable that the quantity of the acquired images fall within a certain range. In the case of still images, the quantity of the images is the number of the images or the data amount of the images, for example, and in the case of video, the quantity of the images is the number of the video clips, the data amount of the video, or the time length of the video, for example.

Therefore, the information acquisition unit 120 may check the quantity of the images satisfying the image acquisition condition before acquiring the images.

An example of operations in this case will be described using the input device 300 and the display device 400.

The information acquisition unit 120 outputs items that can be used as image acquisition conditions to the display device 400. The display device 400 displays the acquired items (for example, see FIG. 2).

The user instructs an image acquisition condition to the information acquisition unit 120 by using the input device 300.

The information acquisition unit 120 acquires the quantity of the images satisfying the image acquisition condition instructed by the user, from the image acquisition device 200. The information acquisition unit 120 then outputs the acquired quantity of the images to the display device 400. The display device 400 displays the quantity of the images.

The user checks the quantity of the images displayed on the display device 400. If the quantity of the images does not reach a desired quantity, the user changes the image acquisition condition. The information acquisition unit 120 acquires the quantity of images satisfying the changed image acquisition condition from the image acquisition device 200, and outputs the acquired quantity of images to the display device 400. The display device 400 displays the quantity of the images.

The user changes the image acquisition condition until the number of images reaches the desired number. If the quantity of the images reaches the desired number, the user instructs the information acquisition unit 120 to use the image acquisition condition with the desired quantity, by using the input device 300.

The information acquisition unit 120 uses the image acquisition condition instructed by the user as the image acquisition condition to be output to the image acquisition device 200.

In this manner, the information acquisition unit 120 can use the image acquisition condition under which a quantity of images desired by the user or the like can be acquired. That is, the information acquisition unit 120 can generate an image acquisition condition for acquiring an appropriate quantity of images for guidance on driving.

The information acquisition unit 120 then outputs the generated image acquisition condition to the image acquisition device 200 via the communication unit 110.

If there are a plurality of image acquisition devices 200, the information acquisition unit 120 may output the image acquisition condition to all the image acquisition devices 200. Alternatively, the information acquisition unit 120 may output the image acquisition condition to a predetermined image acquisition device 200 or an image acquisition device 200 relevant to a predetermined instruction (for example, a user instruction).

In the case of outputting the image acquisition condition to the plurality of image acquisition devices 200, the information acquisition unit 120 may output the same image acquisition condition to all the image acquisition devices 200. Alternatively, the information acquisition unit 120 may output different image acquisition conditions to at least some of the image acquisition devices 200. In this case, the information acquisition unit 120 may generate image acquisition conditions to be output to the corresponding image acquisition devices 200 based on a user instruction.

The information acquisition unit 120 then acquires images satisfying the image acquisition condition from the image acquisition device 200 via the communication unit 110.

The information acquisition unit 120 may limit images acquired from the image acquisition device 200. For example, the information acquisition unit 120 may acquire a preset quantity of images according to a predetermined rule. For example, the information acquisition unit 120 may acquire a predetermined quantity of images from the most recently acquired image. Alternatively, the information acquisition unit 120 may acquire a predetermined quantity of images in such a way as to have an equal distribution in a predetermined period.

In the case of acquiring images from the plurality of image acquisition devices 200, the information acquisition unit 120 may acquire the same quantity of images from all the image acquisition devices 200, or may acquire different quantities of images from at least some of the image acquisition devices 200.

The driver may drive a plurality of vehicles. Therefore, the information acquisition unit 120 may acquire images relevant to the driver from the plurality of image acquisition devices 200 based on information related to the driver's work (for example, the vehicles driven by the driver and the dates and times), and collectively set the acquired images as images relevant to the driver.

Alternatively, a plurality of drivers may drive the same vehicle. Therefore, the information acquisition unit 120 may divide the image acquired from one image acquisition device 200 into images relevant to the plurality of drivers based on information related to the drivers' working (for example, the vehicle driven by the drivers and the dates and times).

Then, the information acquisition unit 120 stores the acquired images in the image storage unit 140.

The image storage unit 140 stores images.

The information acquisition unit 120 may output the acquired images to the driving information generation unit 150.

The driving information generation unit 150 uses the images stored in the image storage unit 140 to generate information (driving information) related to driving of the vehicle equipped with the image acquisition device 200 by the driver. The driving information generation unit 150 may use the driving-related information stored in the related information storage unit 130 to generate the driving information.

If the images include a plurality of images (for example, an image of the front, an image of the rear, and an image of the vehicle interior), the driving information generation unit 150 may generate the driving information by combining all the images. Alternatively, the driving information generation unit 150 may generate the driving information using one or some images.

The driving information is information related to driving by the driver, particularly, information used for guidance on driving to the driver. The specific contents of the driving information may be determined by the user or the like in accordance with the driving to be instructed.

The guidance on driving is not limited to guidance on safe driving. For example, in the case of introducing a new type of vehicle or device, the guidance on driving may be guidance on understanding the characteristics of the vehicle type (for example, the position of the blind spot) or the characteristics of the device (for example, braking performance of the brake).

The method of generating the driving information in the driving information generation unit 150 may be any method, and may be determined in accordance with guidance on driving. For example, the user of the driving information output system 10 determines a method in advance and sets the method to the driving information generation unit 150.

For example, the driving information indicates a state of the driver (a state of the driver who is driving the vehicle) and a state of the vehicle (hereinafter, these states will be collectively referred to as "driving state").

For example, the driving information generation unit 150 may generate information indicating, as the state of the driver, at least one of the movement of the line of sight, the frequency of blinking, the movement of the head, the operation frequency of the steering wheel, and the operation frequency of the lever by the driver, by using the image of the vehicle interior. In a case where the image includes sounds, the driving information generation unit 150 may generate information indicating at least one of the time and frequency of conversation and the frequency of a horn beeping.

The driving information generation unit 150 may further calculate a detailed state of the driver using the generated information. For example, the driving information generation unit 150 may calculate at least one of the level of arousal, the level of attention to the surroundings, the level of concentration on driving, and the frequency of looking away of the driver, using the movement of the line of sight, the frequency of blinking, and the movement of the head.

Alternatively, the driving information generation unit 150 may generate, as the state of the vehicle, at least one of information related to whether the speed exceeds a legal speed, a state of acceleration (sudden acceleration, sudden deceleration, sudden steering, and the like), an inter-vehicle distance, and interruption, by using the images.

The driving information generation unit 150 may extract an image associated to the generated driving state from among the images. For example, the driving information generation unit 150 may output an image that satisfies a predetermined condition (for example, the inter-vehicle distance is shorter than a threshold, or the acceleration is larger than the threshold) in the driving information.

The driving information generation unit 150 may use a plurality of images acquired from a plurality of image acquisition devices 200 to generate driving information related to each of the images. Further, the driving information generation unit 150 may compare a plurality of pieces of driving information.

For example, if each driver is fixed to a vehicle, the image acquired from each image acquisition device 200 is an image associated to the driver who drives the vehicle in which the image acquisition device 200 is mounted. Therefore, the driving information generated by the driving information generation unit 150 is driving information related to the driver. As a result, the comparison of the driving information is the comparison of the driving operations of the drivers. That is, the driving information generation unit 150 may compare the driving information related to the plurality of drivers and generate information for comparing the driving operations of the drivers (for example, the comparison results).

For example, the driving information generation unit 150 may calculate a difference between the driving state included in the driving information of a certain driver and the driving state included in the driving information of another driver (for example, a difference in time during which the speed limit was exceeded or a difference in the frequency of sudden acceleration and sudden deceleration).

If there is a plurality of drivers, the driving time and the driving position are different from each other.

Therefore, even if images are acquired at the same time in a certain period (for example, several months) as images of a plurality of drivers, for example, driving places are different in many of the images. In this case, it is difficult to compare the driving states of the drivers.

However, in the driving information output device 100, the information acquisition unit 120 can acquire images satisfying the image acquisition condition obtained by combining a plurality of items, from the plurality of image acquisition devices 200. For example, the information acquisition unit 120 can acquire images that are the same in a combination of acquisition time, weather, and spot, from the plurality of image acquisition devices 200. In this manner, the information acquisition unit 120 can acquire images associated to substantially the same conditions for the plurality of drivers.

The driving information generation unit 150 can generate driving information of a plurality of drivers using a plurality of images and compare the plurality of pieces of generated driving information.

Therefore, the driving information output device 100 can output information for comparing the driving states of the drivers.

Alternatively, the driving information generation unit 150 may store the driving information related to the exemplary driving state in advance, and generate information for comparing the exemplary driving information with the generated driving information (for example, the comparison results).

Even if a driver is not fixed to a vehicle, when the information acquisition unit 120 acquires an image associated to the driver, the driving information generation unit 150 may generate the driving information related to the driver using the image associated to the driver.

The driving information generation unit 150 may further generate driving information for a preset set of images (for example, a set of images relevant to a group of drivers). In this case, the driving information generation unit 150 may generate the driving information for each of a plurality of sets. The driving information generation unit 150 may further generate information for comparing a plurality of pieces of generated driving information for the plurality of sets (for example, the comparison results). That is, the driving information generation unit 150 may generate information for comparing the driving information of the groups of drivers (for example, the comparison results).

The driving information generation unit 150 may further generate the driving information using diagnostic criteria associate to the image acquisition condition.

FIG. 6 is a diagram illustrating an example of correspondences between image acquisition conditions and diagnostic criteria.

For example, in order to provide guidance on driving in case of snow accumulation, the information acquisition unit 120 acquires an image using "snowy" as an image acquisition condition. In this case, the driving information generation unit 150 uses "inter-vehicle distance" as a diagnostic criterion associated to "snowy". As the inter-vehicle distance used for diagnosis, for example, the driving information generation unit 150 may acquire the inter-vehicle distance from the driving-related information, or may calculate the inter-vehicle distance by applying predetermined image processing to the acquired image.

Alternatively, in order to provide guidance on driving in the early morning, the information acquisition unit 120 acquires the image using "early morning" as an image acquisition condition. The driving information generation unit 150 uses "arousal level" as a diagnostic criterion associated "early morning". In this case, for example, the driving information generation unit 150 calculates the movement of the line of sight, the frequency of blinks, and the movement of the head of the driver using the image of the vehicle interior, and calculates the arousal level based on the calculated movement of the line of sight, frequency of blinks, and movement of the head.

As described above, the driving information output device 100 may acquire an image that satisfies the image acquisition condition suitable for guidance on driving, and generate the driving information using the acquired image and the diagnostic criteria suitable for guidance on driving.

The driving information generation unit 150 may use other diagnostic criteria in addition to the diagnostic criteria associate to the image acquisition condition.

For example, in order to provide guidance on driving in case of snow accumulation, the information acquisition unit 120 acquires an image using "snowy" as an image acquisition condition. The driving information generation unit 150 may generate the driving information using the image associated to the image acquisition condition "snowy", the diagnostic criterion "inter-vehicle distance" associated to the image acquisition condition "snowy", and the diagnostic criterion "frequency of interruption" not necessarily being associated to the image acquisition condition "snowy". Also in this case, the driving information output device 100 can generate appropriate driving information using the image, as guidance to the driver.

The correspondences between the image acquisition conditions and the diagnostic criteria illustrated in FIG. 6 are examples. The driving information generation unit 150 may use correspondences between image acquisition conditions and diagnostic criteria that are different from those in FIG. 6.

The description returns to the description with reference to FIG. 1.

The driving information generation unit 150 may use the driving-related information in generating the driving information.

Alternatively, the driving information generation unit 150 may store the generated driving information as a history and generate statistical driving information using the history of the driving information.

The driving information generation unit 150 may further generate an index of safe driving for the driver based on the driving state (at least one of the state of the driver and the state of the vehicle).

In accordance with such operations, the driving information output device 100 can provide an index of safe driving for driving by the driver of the vehicle.

The index of safe driving is set arbitrarily. The user may appropriately set the index according to the driving to be instructed.

For example, the driving information generation unit 150 may calculate how much the frequency of change in speed is higher or lower than a predetermined value (for example, the frequency in average driving) as the index of safe driving. Alternatively, the driving information generation unit 150 may calculate the ratio of a time during which the inter-vehicle distance in each speed zone is shorter than a safe distance as the index of safe driving. Alternatively, the driving information generation unit 150 may generate the ratio of the "time of potentially dangerous driving operation" to the "entire driving time" as the index of safe driving. Alternatively, the driving information generation unit 150 may generate the frequency of "potentially dangerous driving operation" in a predetermined period as the index of safe driving.

The driving information generation unit 150 may use classified indexes. The classified indexes are set arbitrarily. For example, the driving information generation unit 150 may use "large risk, medium risk, small risk" as classes for the risk level of driving. In this case, for example, the driving information generation unit 150 may determine the classes of risk associated to the driving information based on the frequency of the "potentially dangerous driving operation" in a predetermined period.

As described above, the information acquisition unit 120 may acquire a plurality of images and generate a plurality of pieces of driving information. In this case, the driving information generation unit 150 may generate information for comparing the plurality of pieces of generated driving information (for example, the comparison results), and generate the index of safe driving for each driving information by using the generated information (for example, the comparison results).

The driving information generation unit 150 then outputs the generated driving information to a predetermined device (for example, the display device 400) via the output unit 160.

The driving information generation unit 150 may output an image related to the driving information to a predetermined device (for example, the display device 400). For example, the driving information generation unit 150 may output an image that satisfies a predetermined condition (for example, the inter-vehicle distance is shorter than a threshold, or the acceleration is larger than the threshold) in the driving information.

Alternatively, the driving information generation unit 150 may output at least one of an index generated based on the driving information and information for comparing a plurality of pieces of driving information (for example, the comparison results) to a predetermined device (for example, the display device 400). In this case, the predetermined device (for example, the display device 400) may display at least one of the index and the information for comparison (for example, the comparison results).

The output unit 160 relays communication between the components (the information acquisition unit 120 and the driving information generation unit 150) and a predetermined device (for example, the display device 400).

[Description of Operations]

Next, operations of the driving information output device 100 according to the first example embodiment will be described with reference to the drawings.

FIG. 7 is a flowchart illustrating an example of operations of the driving information output device 100 according to the first example embodiment.

The information acquisition unit 120 acquires the driving-related information from the image acquisition device 200 via the communication unit 110 (step S101). The information acquisition unit 120 stores the acquired driving-related information in the related information storage unit 130.

The information acquisition unit 120 generates an image acquisition condition. The information acquisition unit 120 then specifies the image acquisition condition via the communication unit 110 and requests an image from the image acquisition device 200 (step S102). In generating the image acquisition condition, the information acquisition unit 120 may use the driving-related information and may acquire at least some of image acquisition conditions or an instruction related to the image acquisition conditions from the user, from a predetermined device (for example, input device 300). The information acquisition unit 120 may further output information related to the instruction to a predetermined device (for example, the display device 400) via the output unit 160.

The information acquisition unit 120 then acquires images satisfying the image acquisition condition from the image acquisition device 200 via the communication unit 110 (step S103). The information acquisition unit 120 stores the acquired images in the image storage unit 140.

The driving information generation unit 150 generates driving information using the images (step S104). The driving information generation unit 150 may use the driving-related information in generating the driving information.

The driving information generation unit 150 then outputs the driving information to a predetermined device (for example, the display device 400) via the output unit 160 (step S105). The driving information generation unit 150 may output an image associated to the driving information.

Next, operations of the driving information output system 10 according to the first example embodiment will be described with reference to the drawings.

FIG. 8 is a sequence diagram illustrating an example of operations of the driving information output system 10 according to the first example embodiment.

The image acquisition device 200 acquires the images and the driving-related information (S111).

The image acquisition device 200 outputs the driving-related information to the driving information output device 100 (S112).

The driving information output device 100 generates an image acquisition condition using the driving-related information (S113). The driving information output device 100 may use the input device 300 and the display device 400 in generating the image acquisition condition.

The driving information output device 100 specifies the image acquisition condition and requests an image from the image acquisition device 200 (S114).

The image acquisition device 200 outputs the image satisfying the image acquisition condition to the driving information output device 100 (S115).

The driving information output device 100 generates driving information using the image acquired from the image acquisition device 200 (S116).

The driving information output device 100 outputs the generated driving information to the display device 400 (S117).

The display device 400 displays the driving information output by the driving information output device 100 (S118).

Description of Advantageous Effects

Next, advantageous effects of the driving information output device 100 according to the first example embodiment will be described.

The driving information output device 100 according to the first example embodiment can obtain advantageous effects of acquiring images suitable for guidance on driving while reducing the load of image acquisition, and providing information related to driving of a vehicle by a driver using the acquired images.

The reasons are as follows.

The driving information output device 100 includes the communication unit 110, the information acquisition unit 120, the driving information generation unit 150, and the output unit 160. The communication unit 110 communicates with the image acquisition device 200 mounted in the vehicle. The information acquisition unit 120 acquires, from the image acquisition device 200 via the communication unit 110, images that satisfy an image acquisition condition including an image acquisition position, an image acquisition time, and at least one of the operating state of the vehicle and the surrounding environment of the vehicle in image acquisition. The driving information generation unit 150 generates driving information that is information related to driving by the driver of the vehicle based on the acquired images. The output unit 160 outputs the driving information.

As described above, the information acquisition unit 120 acquires images satisfying the image acquisition condition from the image acquisition device 200 via the communication unit 110. The image acquisition condition is a condition for acquiring an image suitable for guidance on driving. Therefore, the information acquisition unit 120 can acquire desired images via the communication unit 110 as images suitable for guidance on driving. Further, the driving information output device 100 can restrict acquisition of undesired images.

In accordance with such operations, the driving information output device 100 acquires images suitable for guidance on driving while reducing the load of image acquisition.

The image acquisition condition includes the image acquisition position, the image acquisition time, and at least one of the operating state of the vehicle and the surrounding environment of the vehicle at the time of image acquisition.

The driving information generation unit 150 generates driving information using the images acquired from the image acquisition device 200. The driving information generation unit 150 then outputs the generated driving information to a predetermined device (for example, the display device 400) via the output unit 160.

In accordance with such operations, the driving information output device 100 can generate information (driving information) related to driving by the driver of the vehicle using images suitable for guidance on driving, and can provide the generated driving information. That is, the driving information output device 100 can output suitable driving information.

Further, the information acquisition unit 120 acquires, from the image acquisition device 200 via the communication unit 110, driving-related information including an image acquisition position, an image acquisition time, and at least one of the operating state of the vehicle and the surrounding environment of the vehicle at the time of image acquisition. The information acquisition unit 120 may generate an image acquisition condition based on the acquired driving-related information.

In accordance with such operations, the driving information output device 100 can determine an image acquisition condition suitable for the image acquired by the image acquisition device 200.

The driving information generation unit 150 may generate at least one of the state of the driver and the state of the vehicle as the driving information.

In accordance with such an operation, the driving information output device 100 can provide driving information related to at least one of the state of the driver and the state of the vehicle.

The driving information generation unit 150 may further generate an index of safe driving for the driver based on at least one of the state of the driver and the state of the vehicle.

In accordance with such an operation, the driving information output device 100 can provide an index used for guidance of safe driving for the driver.

The information acquisition unit 120 may acquire a plurality of images from a plurality of image acquisition devices 200. The driving information generation unit 150 may generate a plurality of pieces of driving information using the plurality of acquired images and generate information for comparing the plurality of pieces of generated driving information (for example, the comparison results).

In accordance with such operations, the driving information output device 100 can provide information for comparing a plurality of drivers (for example, the comparison results) as guidance on driving.

The driving information generation unit 150 may further generate the driving information using diagnostic criteria associate to the image acquisition condition.

In accordance with such an operation, the driving information output device 100 generates appropriate driving information as driving information related to the acquired image.

The information acquisition unit 120 may further acquire at least some of image acquisition conditions from a predetermined device (for example, the input device 300). Alternatively, the information acquisition unit 120 may acquire a user instruction related to generation of the image acquisition condition from a predetermined device (for example, the input device 300), and generate the image acquisition condition in response to the acquired instruction.

In accordance with such an operation, the information acquisition unit 120 can acquire an image desired by the user or the like. In this case, the driving information generation unit 150 generates driving information related to the image desired by the user or the like. As a result, the driving information output device 100 can output driving information flexibly associated to the user's desire or the like.

The driving information output system 10 includes the driving information output device 100, the image acquisition device 200, and the display device 400. The driving information output device 100 operates as described above. The image acquisition device 200 outputs an image to the driving information output device 100. The display device 400 displays the driving information output by the driving information output device 100.

According to the above configuration, the driving information output system 10 provides driving information using a suitable image from among the images acquired by the image acquisition device 200.

The driving information output system 10 further includes the input device 300. The input device 300 outputs at least some of image acquisition conditions or a user instruction related to generation of the image acquisition conditions to the driving information output device 100.

According to the above configuration, the driving information output system 10 provides driving information related to the image desired by the user or the like. That is, the driving information output system 10 can output driving information flexibly associated to the user's desire or the like.

In a second related method, a condition for outputting an image to the drive recorder is set. Therefore, in the case of changing the image output by the drive recorder, it is necessary for the user or the like to change the condition for outputting an image in all the drive recorders.

However, the driving information output system 10 can change the condition for an image for flexibly generating the driving information in accordance with the above configuration.

In a first related method, the image output by the drive recorder cannot be changed.

[Hardware Configuration]

Next, a hardware configuration of the driving information output device 100 will be described.

Each component of the driving information output device 100 may be configured by a hardware circuit.

Alternatively, in the driving information output device 100, each component may be configured using a plurality of devices connected via a network. For example, the driving information output device 100 may be configured using cloud computing.

Alternatively, in the driving information output device 100, the plurality of components may be configured by one piece of hardware.

The driving information output device 100 may be implemented as a computer device including a central processing unit (CPU), a read only memory (ROM), and a random access memory (RAM). In addition to the above configuration, the driving information output device 100 may be implemented as a computer device including a network interface circuit (NIC).

Figure 9:
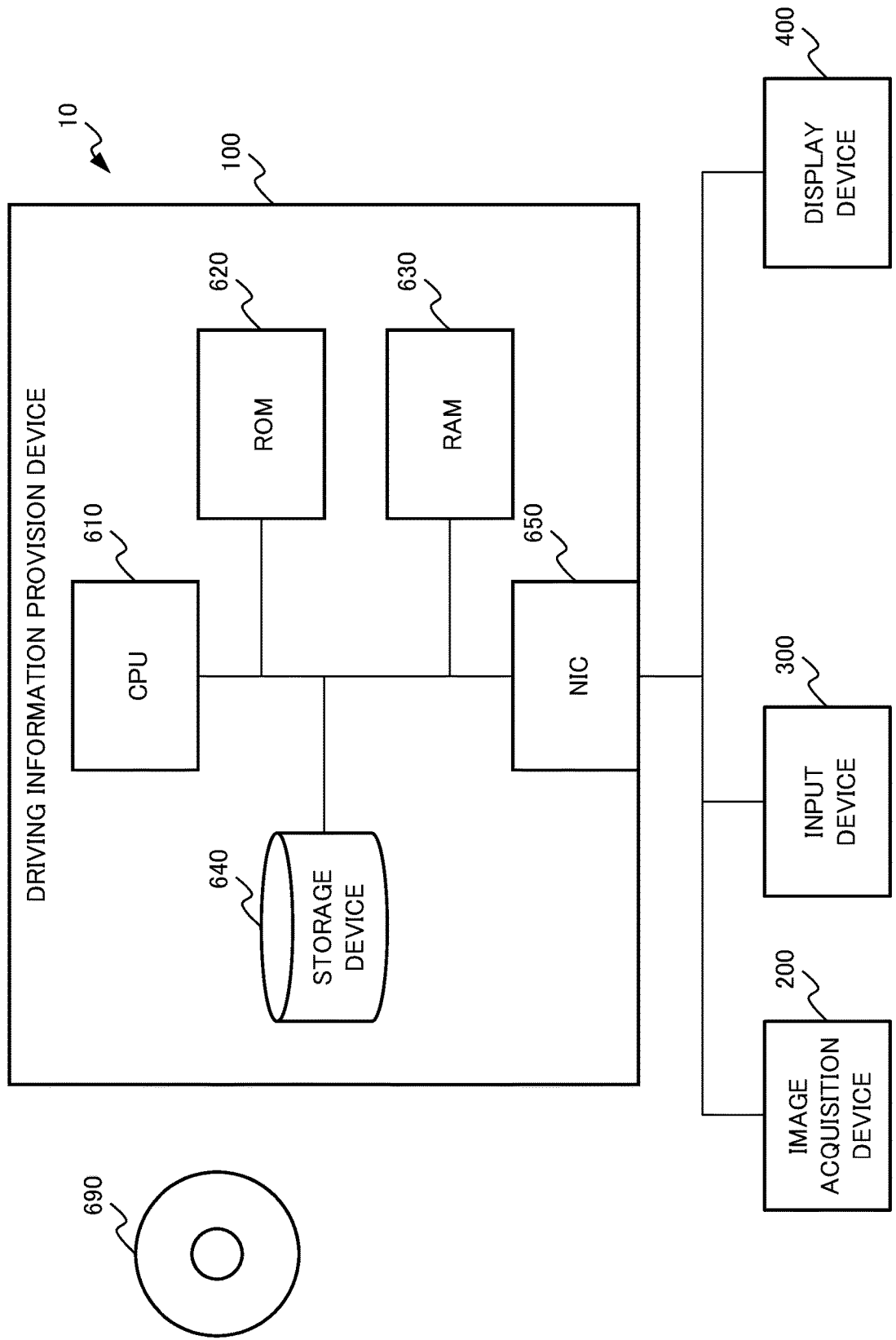
FIG. 9 is a block diagram illustrating an example of a hardware configuration of the driving information output device.

FIG. 9 is a block diagram illustrating an example of a hardware configuration of the driving information output device 100.

The driving information output device 100 includes a CPU 610, a ROM 620, a RAM 630, a storage device 640, and an NIC 650, and thus is implemented as a computer device.

The CPU 610 reads a program from at least one of the ROM 620 and the storage device 640. The CPU 610 then controls the RAM 630, the storage device 640, and the NIC 650 based on the read program. The computer including the CPU 610 controls these components, and implements functions as the communication unit 110, the information acquisition unit 120, the related information storage unit 130, the image storage unit 140, the driving information generation unit 150, and the output unit 160 illustrated in FIG. 1.

When implementing each function, the CPU 610 may use at least one of the RAM 630 and the storage device 640 as a temporary storage medium of a program and data.

In addition, the CPU 610 may read the program included in the recording medium 690 storing the program in a computer readable manner, using a recording medium reading device (not illustrated). Alternatively, the CPU 610 may acquire a program from an external device (not illustrated) via the NIC 650, store the acquired program in the RAM 630 or the storage device 640, and operate based on the stored program.

The ROM 620 stores programs executed by the CPU 610 and fixed data. The ROM 620 is a programmable ROM (P-ROM) or a flash ROM, for example.

The RAM 630 temporarily stores programs and data executed by the CPU 610. The RAM 630 is a dynamic-RAM (D-RAM), for example.

The storage device 640 stores data and programs to be stored for a long time by the driving information output device 100. The storage device 640 operates as the related information storage unit 130 and the image storage unit 140. The storage device 640 may also operate as a temporary storage device in the CPU 610. The storage device 640 is a hard disk device, a magneto-optical disk device, a solid state drive (SSD), or a disk array device, for example.

The ROM 620 and the storage device 640 are non-transitory recording media. On the other hand, the RAM 630 is a transitory recording medium. The CPU 610 is operable based on programs stored in the ROM 620, the storage device 640, or the RAM 630. That is, the CPU 610 can operate using a non-transitory recording medium or a transitory recording medium.

The NIC 650 relays exchange of data with external devices (the image acquisition device 200, the input device 300, and the display device 400) via a network. The NIC 650 is a local area network (LAN) card, for example. The NIC 650 is not limited to wired communication, and may be used for wireless communication.

The driving information output device 100 in FIG. 9 configured as described above can obtain the same advantageous effects as those of the driving information output device 100 in FIG. 1.

The reason is that the CPU 610 of the driving information output device 100 can implement the same functions as those of the driving information output device 100 in FIG. 1 based on the programs.

At least one of the input device 300 and the display device 400 may be configured using the computer device illustrated in FIG. 9 or cloud computing.

Alternatively, the image acquisition device 200 may be configured using the computer device illustrated in FIG. 9.

Second Example Embodiment

A driving information output device 100 may use an external device (for example, a storage device) not illustrated as a related information storage unit 130 and an image storage unit 140.

In these cases, the driving information output device 100 may not include the related information storage unit 130 and the image storage unit 140.

Alternatively, an information acquisition unit 120 may output an acquired image to a driving information generation unit 150.

Alternatively, the information acquisition unit 120 may acquire and store image acquisition conditions in advance. In this case, the information acquisition unit 120 may not be connected to an input device 300.

Therefore, as a second example embodiment, an example embodiment in the above case will be described.

Figure 10:
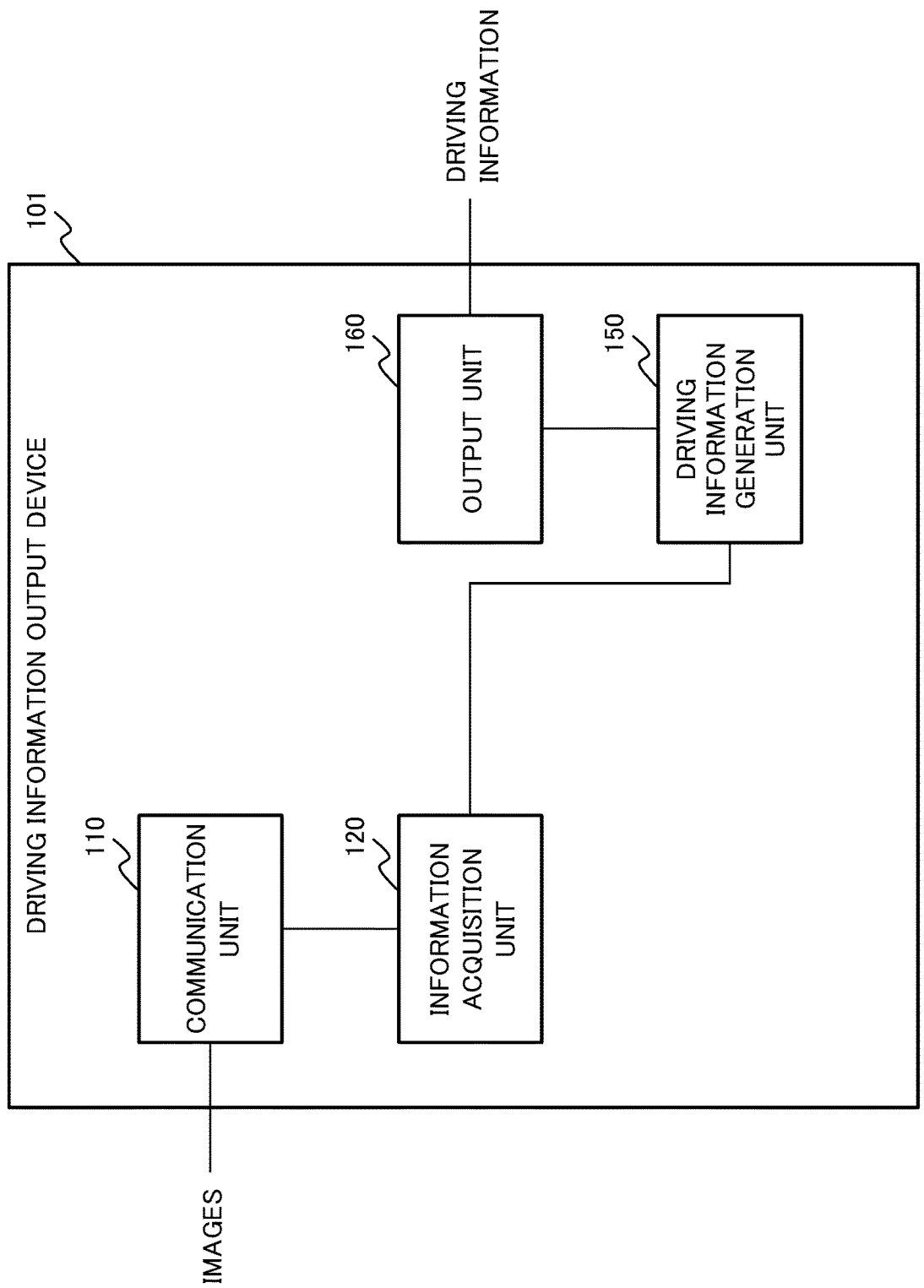
FIG. 10 is a block diagram illustrating an example of a configuration of a driving information output device according to a second example embodiment.

FIG. 10 is a block diagram illustrating an example of a configuration of a driving information output device 101 according to the second example embodiment.

The driving information output device 101 includes a communication unit 110, an information acquisition unit 120, a driving information generation unit 150, and an output unit 160. The communication unit 110 communicates with the image acquisition device 200 mounted in the vehicle. The information acquisition unit 120 acquires, from the image acquisition device 200 via the communication unit 110, images that satisfy an image acquisition condition including an image acquisition position, an image acquisition time, and at least one of the operating state of the vehicle and the surrounding environment of the vehicle in image acquisition. The driving information generation unit 150 generates driving information that is information related to driving by the driver of the vehicle based on the acquired images. The output unit 160 outputs the driving information.

The driving information output device 101 configured as described above can obtain the same advantageous effects as those of the driving information output device 100. That is, the driving information output device 101 can obtain advantageous effects of acquiring images suitable for guidance on driving while reducing the load of image acquisition, and providing information related to driving of a vehicle by a driver using the acquired images.

The driving information output device 101 may be implemented using a computer device illustrated in FIG. 9.

The driving information output device 101 has the minimum configuration of the driving information output device 100 in the first example embodiment.

Figure 11:
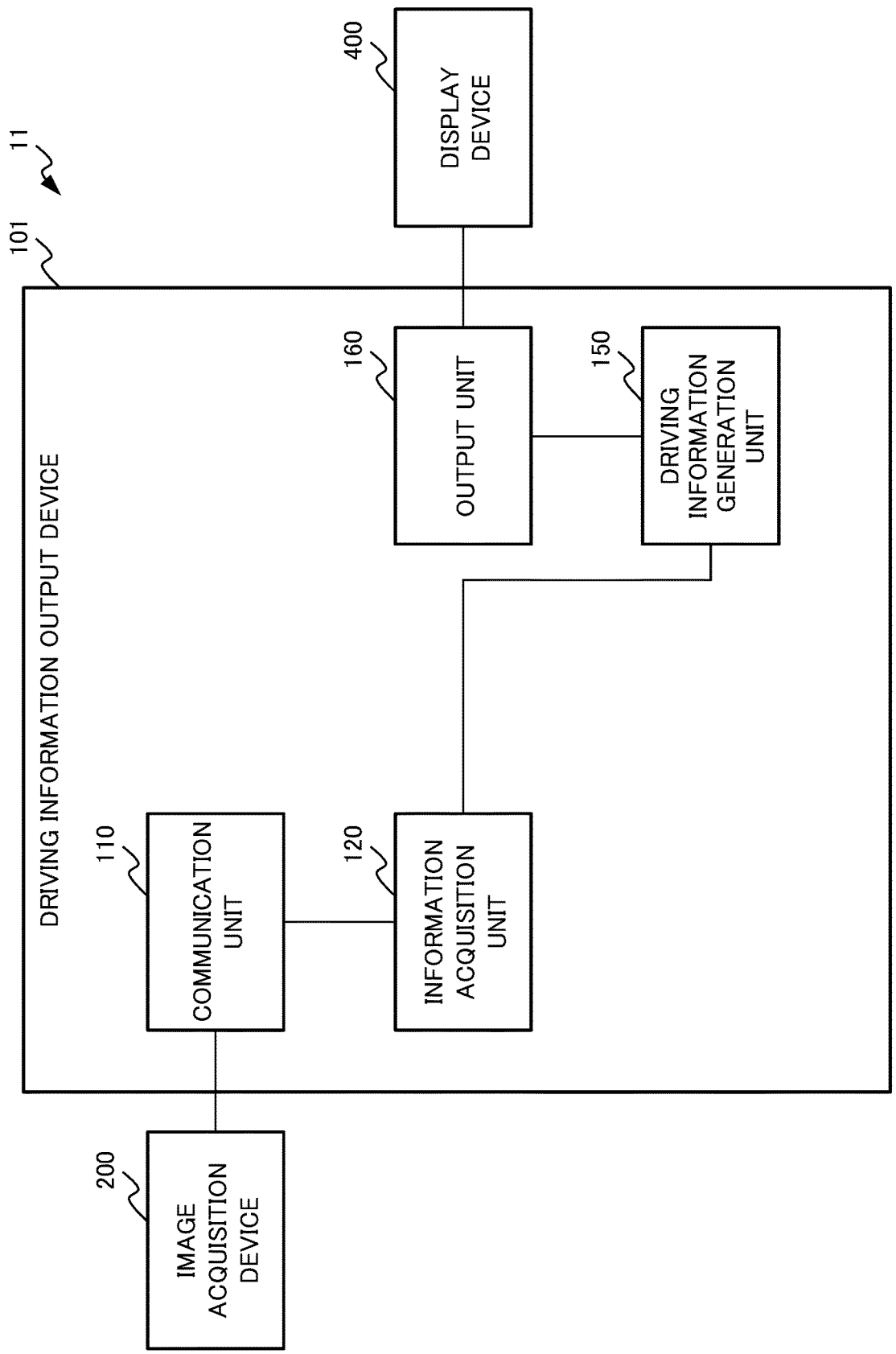
FIG. 11 is a block diagram illustrating an example of a configuration of a driving information output system including the driving information output device according to the second example embodiment.

FIG. 11 is a block diagram illustrating an example of a configuration of a driving information output system 11 including the driving information output device 101 according to the second example embodiment.

The driving information output system 11 includes a driving information output device 101, an image acquisition device 200, and a display device 400. The driving information output device 101 operates as described above. The image acquisition device 200 outputs an image to the driving information output device 100. The display device 400 displays the driving information output by the driving information output device 100.

The driving information output system 11 configured as described above can obtain the same advantageous effects as those of the driving information output system 10 in the first example embodiment.

The driving information output system 11 has the minimum configuration of the driving information output system 10 in the first example embodiment.

Some or all of the above example embodiments may be described as the following supplementary notes, but are not limited to the following supplementary notes.

Supplementary Note 1

A driving information output device including:
a communication means that communicates with an image acquisition device mounted in a vehicle,
an information acquisition means that acquires, from the image acquisition device via the communication means, an image that satisfies an image acquisition condition including an image acquisition position, an image acquisition time, and at least one of an operating state of the vehicle and a surrounding environment of the vehicle at time of image acquisition,
a driving information generation means that generates driving information that is information related to driving by a driver of the vehicle based on the acquired image, and
an output means that outputs the driving information.

Supplementary Note 2

The driving information output device according to Supplementary Note 1, wherein
the information acquisition means acquires, from the image acquisition device via the communication means, driving-related information including the image acquisition position, the image acquisition time, and at least one of the operating state of the vehicle and the surrounding environment of the vehicle at the time of image acquisition, and generates the image acquisition condition based on the acquired driving-related information.

Supplementary Note 3

The driving information output device according to Supplementary Note 1 or 2, wherein
the driving information generation means generates at least one of a state of the driver and a state of the vehicle as the driving information.

Supplementary Note 4

The driving information output device according to Supplementary Note 3, wherein
the driving information generation means generates an index of safe driving for the driver by using at least one of the state of the driver and the state of the vehicle.

Supplementary Note 5

The driving information output device according to any one of Supplementary Notes 1 to 4, wherein
the information acquisition means acquires a plurality of images from a plurality of the image acquisition devices, and
the driving information generation means generates a plurality of pieces of the driving information using the plurality of acquired images and generates information for comparing the plurality of pieces of generated driving information.

Supplementary Note 6

The driving information output device according to any one of Supplementary Notes 1 to 5, wherein
the driving information generation means generates the driving information by using a diagnostic criterion associated to the image acquisition condition.

Supplementary Note 7

The driving information output device according to any one of Supplementary Notes 1 to 6, wherein
the information acquisition means acquires at least some of the image acquisition conditions from a predetermined device, or acquires a user instruction related to generation of the image acquisition conditions from a predetermined device, and generates the image acquisition conditions associated to the acquired instruction.

Supplementary Note 8

A driving information output system including:
the driving information output device according to any one of Supplementary Notes 1 to 7,
the image acquisition device that outputs an image to the driving information output device, and
a display device that displays the driving information output by the driving information output device.

Supplementary Note 9

A driving information output system including:
the driving information output device according to Supplementary Note 7,
the image acquisition device that outputs an image to the driving information output device,
a display device that displays the driving information output by the driving information output device, and an input device that outputs, to the driving information output device, at least some of the image acquisition conditions or the user instruction related to generation of the image acquisition conditions.

Supplementary Note 10

A driving information output method including:

The invention claimed is:

1. An apparatus comprising:
a communication interface configured to communicate with an image acquisition device mounted on a vehicle;
a memory; and
at least one processor coupled to the memory,
the processor performing operations, the operations comprising:
acquiring, from the image acquisition device via the communication interface, an image that satisfies an image acquisition condition including an image acquisition position, an image acquisition time, and at least one of an operating state of the vehicle and a surrounding environment of the vehicle at time of image acquisition;
generating driving information based on the acquired image, the driving information being related to driving by a driver of the vehicle; and
outputting the driving information, wherein the operations further comprise:
acquiring, from the image acquisition device, driving-related information including an image acquisition position, an image acquisition time, and at least one of the operating state of the vehicle and surrounding environment of the vehicle at the time of image acquisition;
outputting information related to the driving-related information to a display device that displays the information related to the driving-related information;
acquiring, from an input device, an item selected by a user from among the information related to the driving-related information;
generating the image acquisition condition based on the item selected by the user; and
outputting the generated image acquisition condition to the image acquisition device.

2. The apparatus according to claim 1, wherein the operations further comprise:
generating at least one of a state of the driver and a state of the vehicle as the driving information.

3. The apparatus according to claim 2, wherein the operations further comprise:
generating an index of safe driving for the driver by using at least one of the state of the driver and the state of the vehicle.

4. The apparatus according to claim 1, wherein the operations further comprise:
acquiring a plurality of images from a plurality of the image acquisition devices, and
generating a plurality of pieces of the driving information using the plurality of acquired images and generating information for comparing the plurality of pieces of generated driving information.

5. The apparatus according to claim 1, wherein the operations further comprise:
generating the driving information by using a diagnostic criterion associated to the image acquisition condition.

6. The apparatus according to claim 1, wherein the operations further comprise:
acquiring at least some of the image acquisition conditions from a predetermined device, or acquiring a user instruction related to generation of the image acquisition conditions from a predetermined device, and generating the image acquisition conditions associated to the acquired instruction.

7. A method comprising:
acquiring, from an image acquisition device mounted on a vehicle, an image that satisfies an image acquisition condition including an image acquisition position, an image acquisition time, and at least one of an operating state of the vehicle and a surrounding environment of the vehicle at time of image acquisition;
generating driving information based on the acquired image, the driving information being related to driving by a driver of the vehicle; and
outputting the driving information, wherein the method further comprises:
acquiring, from the image acquisition device, driving-related information including an image acquisition position, an image acquisition time, and at least one of the operating state of the vehicle and surrounding environment of the vehicle at the time of image acquisition;
outputting information related to the driving-related information to a display device that displays the information related to the driving-related information;
acquiring, from an input device, an item selected by a user from among the information related to the driving-related information;
generating the image acquisition condition based on the item selected by the user; and
outputting the generated image acquisition condition to the image acquisition device.

8. The method according to claim 7, further comprising:
generating at least one of a state of the driver and a state of the vehicle as the driving information.

9. The method according to claim 8, further comprising:
generating an index of safe driving for the driver by using at least one of the state of the driver and the state of the vehicle.

10. The method according to claim 7, further comprising:
acquiring a plurality of images from a plurality of the image acquisition devices; and
generating a plurality of pieces of the driving information using the plurality of acquired images and generating information for comparing the plurality of pieces of generated driving information.

11. The method according to claim 7, further comprising:
generating the driving information by using a diagnostic criterion associated to the image acquisition condition.

12. The method according to claim 7, further comprising:
acquiring at least some of the image acquisition conditions from a predetermined device, or acquiring a user instruction related to generation of the image acquisition conditions from a predetermined device, and generating the image acquisition conditions associated to the acquired instruction.

13. A non-transitory computer-readable recording medium that embodies a program for causing a computer to perform a method, the method comprising:
acquiring, from an image acquisition device mounted on a vehicle, an image that satisfies an image acquisition condition including an image acquisition position, an image acquisition time, and at least one of an operating state of the vehicle and a surrounding environment of the vehicle at time of image acquisition;

generating driving information based on the acquired image, the driving information being related to driving by a driver of the vehicle; and outputting the driving information, wherein the method further comprises acquiring, from the image acquisition device, driving-related information including an image acquisition position, an image acquisition time, and at least one of the operating state of the vehicle and surrounding environment of the vehicle at the time of image acquisition;

outputting information related to the driving-related information to a display device that displays the information related to the driving-related information;

acquiring, from an input device, an item selected by a user from among the information related to the driving-related information;

generating the image acquisition condition based on the item selected by the user; and outputting the generated image acquisition condition to the image acquisition device.

14. The recording medium according to claim 13 that embodies a program for causing a computer to perform a method, the method comprising:

generating at least one of a state of the driver and a state of the vehicle as the driving information.

15. The recording medium according to claim 14 that embodies a program for causing a computer to perform a method, the method comprising:

generating an index of safe driving for the driver by using at least one of the state of the driver and the state of the vehicle.

16. The recording medium according to claim 13 that embodies a program for causing a computer to perform a method, the method comprising:

acquiring a plurality of images from a plurality of the image acquisition devices; and generating a plurality of pieces of the driving information using the plurality of acquired images, and generating information for comparing the plurality of pieces of generated driving information.

17. The recording medium according to claim 13 that embodies a program for causing a computer to perform a method, the method comprising:

generating the driving information by using a diagnostic criterion associated to the image acquisition condition.

18. The apparatus according to claim 1, wherein the operations further comprise:

acquiring, from the image acquisition device, a quantity of the images that satisfy the image acquisition condition; and outputting the quantity of the images that satisfy the image acquisition condition.

19. The method according to claim 7, wherein the method further comprises:

acquiring, from the image acquisition device, a quantity of the images that satisfy the image acquisition condition; and outputting the quantity of the images that satisfy the image acquisition condition.

20. The recording medium according to claim 13 that embodies a program for causing a computer to perform a method, the method comprising:

acquiring, from the image acquisition device, a quantity of the images that satisfy the image acquisition condition; and outputting the quantity of the images that satisfy the image acquisition condition.

\* \* \* \* \*